US007152494B2

(12) United States Patent
Peacey et al.

(10) Patent No.: US 7,152,494 B2
(45) Date of Patent: Dec. 26, 2006

(54) METHOD OF TESTING

(75) Inventors: David John Peacey, Yeovil (GB); Robert John Phillips, Feniton (GB)

(73) Assignee: Honeywell Normalair-Garret (Holdings) Limited, Somerset (GB)

( * ) Notice: Subject to any disclaimer, the term of this patent is extended or adjusted under 35 U.S.C. 154(b) by 0 days.

(21) Appl. No.: 10/753,789

(22) Filed: Jan. 8, 2004

(65) Prior Publication Data

US 2004/0187613 A1 Sep. 30, 2004

(30) Foreign Application Priority Data

Feb. 21, 2003 (GB) ................................ 0303936.9

(51) Int. Cl.
*G01N 19/00* (2006.01)

(52) U.S. Cl. .................................................... 73/865.9

(58) Field of Classification Search ............... 73/865.9; 55/353; 95/8, 11

See application file for complete search history.

(56) References Cited

U.S. PATENT DOCUMENTS

| | | | | |
|---|---|---|---|---|
| 4,344,144 | A | 8/1982 | Damico et al. | |
| 4,765,193 | A * | 8/1988 | Holden et al. | 73/865.9 |
| 5,071,453 | A * | 12/1991 | Hradek et al. | 96/111 |
| 5,101,656 | A * | 4/1992 | Miller | 73/23.2 |
| 5,151,166 | A * | 9/1992 | Harral et al. | 205/784 |
| 5,165,625 | A | 11/1992 | Gutman | |
| 5,402,665 | A * | 4/1995 | Hart et al. | 73/1.06 |
| 5,578,115 | A * | 11/1996 | Cole | 96/121 |
| 5,746,806 | A * | 5/1998 | Aylsworth et al. | 95/8 |
| 5,858,063 | A * | 1/1999 | Cao et al. | 95/11 |
| 5,860,418 | A | 1/1999 | Lundberg | |
| 5,902,379 | A * | 5/1999 | Phillips et al. | 96/4 |
| 6,279,377 | B1 * | 8/2001 | Cao | 73/23.31 |
| 2004/0040439 | A1 * | 3/2004 | Cao et al. | 95/96 |
| 2004/0040440 | A1 * | 3/2004 | Phillips | 95/96 |

FOREIGN PATENT DOCUMENTS

| | | |
|---|---|---|
| FR | 2 455 766 | 11/1980 |
| WO | WO02/04076 | 1/2002 |

OTHER PUBLICATIONS

European Search Report of EP 03 02 9368 dated May 7, 2004.

* cited by examiner

*Primary Examiner*—Daniel S. Larkin
*Assistant Examiner*—John Fitzgerald
(74) *Attorney, Agent, or Firm*—Marshall, Gerstein & Borun LLP

(57) ABSTRACT

A method of testing a system including a plurality of modules, each of which in use, produces from an air supply, a product gas which is one of oxygen gas and oxygen enriched gas, the method including providing to an inlet to at least one of the modules, when the module is not in use, a restricted air supply, and at an outlet of the module, sensing at least one of the oxygen concentration and product gas pressure, and analysing the sensed oxygen concentration and/or product gas pressure during a test period to determine the potential performance of the module in use.

18 Claims, 3 Drawing Sheets

METHOD OF TESTING

BACKGROUND TO THE INVENTION

This invention relates to a method of testing a system and more particularly to a method of testing a system which includes a plurality of modules, each of which is capable in use, of producing from an air supply, product gas which is one of oxygen gas and oxygen enriched gas.

DESCRIPTION OF THE PRIOR ART

It has been proposed in our previous patent application WO02/0406, to provide a supply of breathable gas primarily in an emergency situation in an aircraft, for example in the event of a cabin de-pressurisation, using a plurality of on-board oxygen generating modules (OBOGS). Such OBOGS may in one example, each include a bed of active material, such as Zeolite, which adsorbs non-oxygen gas from an air supply, thus to produce a product gas which is oxygen enriched.

In our previous patent application, there is a proposal to maintain the Zeolite beds in a condition ready for immediate use in the event of an emergency. However it is desirable to be able to test the conditions of the beds. Of course, each bed may be operated in turn and the performance of the bed monitored, to test the beds of the system but an air supply, which typically is high pressure air bled from an engine of the aircraft would be required to produce product gas. This would have an economic cost on engine/aircraft performance.

SUMMARY OF THE INVENTION

According to one aspect of the invention we provide a method of testing a system including a plurality of modules, each of which in use, produces from an air supply, product gas which is one of oxygen gas and oxygen enriched gas, the method including providing to an inlet to at least one of the modules, when the module is not in use, a restricted air supply, and at an outlet of the module, sensing at least one of oxygen concentration and product gas pressure, and analysing the sensed oxygen concentration and/or product gas pressure during a test period to determine the potential performance of the module in use.

Thus each of the modules of the system may be tested whilst producing a minimal amount of product gas, thereby eliminating wastage of the air supply.

The analysis may include comparing the sensed oxygen concentration and/or product gas pressure over the test period, with an expected oxygen concentration and/or pressure over the test period to determine the potential performance of the module. Thus for example, in the case of the tested module being of the kind including a bed of molecular sieve material which is in poor condition, e.g. contaminated, or there being a faulty valve, a blockage in or leakage from the system, at least one of the oxygen concentration in, and pressure of the product gas produced by the tested module over the test period, may differ substantially from the expected result.

Preferably the method of the invention includes supplying to the selected module, a metered air supply during the test period, so that the actual sensed oxygen concentration and pressure of the product gas can be meaningfully compared with results expected for that metered air supply.

Metering may be achieved locally of the inlet of the module, e.g. by partially opening only, an inlet valve to the module, although preferably a metering valve is provided upstream of the inlet of the module, so that a common metered supply may be provided to each of the modules of the system e.g. in turn, for testing each of the modules.

In each case, during testing, preferably the product gas produced during the test period, passes from the module via a metering device, such as a restricting orifice or variable opening valve, to maintain a constant flow from the module. During the test period, the product gas may be passed via the metering device to a lower pressure environment, e.g. externally of the system, or into a cabin of the aircraft, where the invention is applied to a system for an aircraft.

Where the module includes a bed of molecular sieve bed material, after the test period, the module under test, may be vented, to cleanse the bed.

Where the module includes a bed of molecular sieve bed material, the air supply may be a pressurised air supply, and the bed may be vented after the test period, to a lower pressure environment. For example, the module may be vented to ambient pressure, externally of the system, e.g. externally of the aircraft where the invention is applied to an aircraft.

Preferably the method includes testing the one module or set of modules, and then subsequently testing another module or set of modules.

According to a second aspect of the invention we provide a system including a plurality of modules, each of which in use, produces from an air supply, a product gas which is one of oxygen gas and oxygen enriched gas, a metering device for metering the air supply to provide a restricted air supply to at least one of the modules for testing, a sensor for sensing the concentration of oxygen in the product gas produced from the restricted air supply during testing, and/or a sensor for sensing the pressure of the product gas produced from the restricted air supply, and there being an analysing apparatus to analyse the sensed oxygen concentration in and/or sensed pressure in the product gas over a test period to determine the potential performance of the module in use.

The system of the second aspect of the invention may have any of the features of the system described in relation to performance of the method of the first aspect of the invention.

According to a third aspect of the invention we provide a method of testing a system including a plurality of modules, each of which in use, produces from an air supply, a product gas which is one of oxygen gas and oxygen enriched gas, the method including operating a selected one of the modules with a first module or a first set of the remaining modules by providing to inlets of the selected module and the first module or the modules of the first set, an air supply, sensing a parameter of the product gas, produced by the selected module and the first module or modules of the first set of modules, operating the selected module with a second module or a second set of the remaining modules, the second module or modules of the second set being different from the first module or modules of the first set, and sensing the parameter of the product gas produced by the selected module and the second module or the modules of the second set, and comparing the parameter sensed with the parameter sensed while the selected module is operated with the first module or first set of modules, to determine the performance of the selected module.

Thus by performing the method of the third aspect of the invention, the potential performance of an individual selected module in use, where the method is performed specifically as a test, or the actual performance of an individual module where the method is performed when the system is functionally operating, may be determined, without having to test operate each module individually. In such a method, a single parameter may be sensed, and upon analysis, this may indicate how the selected module is performing or in the event that the method is performed as a specific test, how the selected module may perform in normal use.

Typically, where the system includes N modules, a first and a second module may be operated together, then the second and a third and so on up until the Nth and first module are operated together. Thus each module may be tested in turn with at least two others of the modules. If during both tests, the parameter sensed does not conform with an expected result, this would indicate that it is the module which is common to both tests, which is under performing. Thus that module may be isolated in the system, or made to perform a specific molecular bed cleansing routine, where the module includes such a bed, for example by venting the bed for a prolonged period to a low pressure environment, and/or introducing into the bed, product gas or an enhanced amount of product gas in an attempt to regenerate the bed material.

In one example, the method of the third aspect of the invention is performed as a specific test method. In this case, the method may include providing to the inlets to the selected module and the first module or first set of the remaining modules, when the modules are not in use, a restricted air supply, and at outlet or outlets of the modules, sensing the parameter, and subsequently providing to the inlets to the selected module and the second module or second set of remaining modules, the restricted air supply, and at an outlet or outlets from the modules, sensing the parameter, and comparing the respective parameters sensed. The air supply may be restricted by metering the air supply to the modules, but preferably only by metering the product gas to restrict the flow of product gas from the system, thereby to maintain a high pressure in the system.

The parameter sensed may be oxygen concentration in the product gas, and/or product gas pressure.

In another example, the method of the third aspect of the invention may be performed during normal operation of the system. Thus the air supply to the modules would not be restricted but the parameter would need to be monitored over the test periods when the selected module is operated with the first module or first set of the remaining modules, and then when the selected module is operated with the second module or second set of the remaining modules.

The method of the third aspect of the invention may be performed repeatedly, selecting a different module sequentially, so that the method may identify a particular module which is underperforming where the method is a specific test, or is underperforming in use. The method of the third aspect of the invention may be performed subsequently to a higher level test as a result of which a group of the modules may be identified which includes at least one underperforming module.

DESCRIPTION OF THE DRAWINGS

Examples of the invention will now be described with reference to the accompanying drawing in which.

DESCRIPTION OF THE PREFERRED EMBODIMENTS

Figure 1:
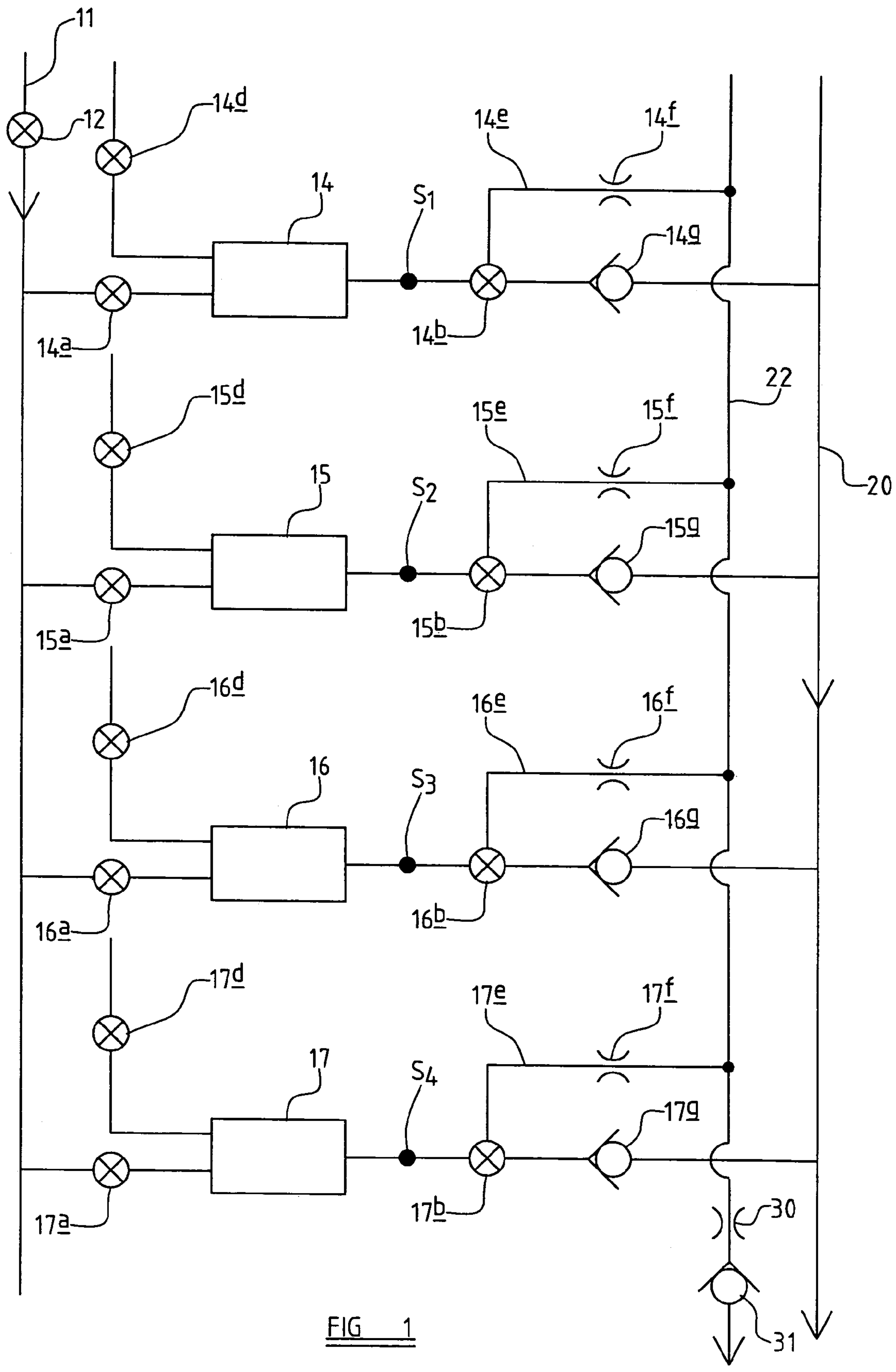
FIG. 1 is an illustrative diagram of a system according to the second aspect of the invention and on which the methods of the first and third aspects of the invention may be performed.

Referring to FIG. 1 there is shown a system 10 for producing from an air supply, product gas which in this case is oxygen enriched gas for breathing.

The system 10 may be installed in an aircraft to provide a supply of breathing gas in an emergency situation such as a cabin de-pressurisation.

Typically the air supply is pressurised air 11 bled from an aircraft engine (although where the engine is not operating when the aircraft is on the ground the pressurised air supply may be provided from a ground based apparatus). The air supply is fed into the system 10 via a main inlet valve 12 which is usually power operated by a controller.

The system 10 includes a plurality of modules 14, 15, 16, 17 in this example, but in practice, any number N of modules may be provided, so to afford the system 10 sufficient capacity in use, to produce an adequate supply of breathable gas.

The modules 14–17 are known as OBOGS and in this example, the modules 14–17 are single units each containing a bed of molecular material, such as Zeolite, which adsorbs at least nitrogen, but possibly other non-oxygen gases too, from air passing over the bed, thus to produce a product gas which is oxygen enriched. Each of the modules 14–17 has at a respective inlet, an inlet valve 14*a*, 15*a*, 16*a*, and 17*a* and in a first phase of operation, a respective inlet valve 14*a*–17*a* is opened to allow air from the supply 11 to flow into a module. Product gas is thus produced and passes from the modules 14–17 via an outlet where there is a respective outlet valve 14*b*–17*b*, into a product gas supply system 20 as is well known in the art.

During a second phase of operation, the respective inlet valves 14*a*–17*a* are closed, the outlet valves 14*b*–17*b* are closed, and a respective vent valve 14*d*–17*d* is opened so that the material in the Zeolite or other molecular bed is exposed to low pressure ambient conditions, as a result of which adsorbed nitrogen is released from the beds, so that subsequently the modules 14–17 may be operated again to adsorb more nitrogen from the air supply to produce more product gas.

Thus each module 14–17 is operated cyclically, and to ensure an even supply of product gas, each of the modules 14–17 may be operated in synchronism with another of the modules 14–17 and in tandem with at least one other of the modules 14–17, and/or each module 14–17 may be operated in the first and second phases of operation, in periods which overlap with respective first and second phases of operation of others of the modules 14–17.

Different regimes for the manner of operation of the modules 14–17 are well documented and do not form a part of the present invention.

In the example system 10 shown in FIG. 1, it can be seen that each outlet valve 14*b*–17*b* is a three way valve. The valves 14*b*–17*b* in a first state of operation are closed, so that the outlets of the respective modules 14–17 are isolated. In a second state of operation, the outlet valves 14*b*–17*b* permit product gas to pass from the modules 14–17, to the breathing gas supply system 20. In a third state of operation, the outlet valves 14b–17b are operated so that product gas from the modules 14–17, may pass into duct 22 which extends to a low pressure environment, via a respective by-pass line 14e–17e. Each by-pass line 14e–17e includes a metering device 14f–17f so that when the respective outlet valves 14b–17b are operated in the third state of operation, pressure in the respective modules 14–17 is maintained, so that the molecular bed material can efficiently functionally operate.

Between the respective outlet valves 14b–17b and the product gas supply system 20, optionally there is a respective non-return valve 14g–17g, to prevent product gas passing back from the product gas supply system 20, to the outlet valves 14b–17d.

As mentioned above, operation of the main inlet valve 12 is controlled by a controller. Each of the inlet 14a–17a, outlet 14b–17b and vent 14d–17d valves are also controlled by the controller, to synchronise operation of the system 10 during product gas production.

In accordance with the first aspect of the invention, to test the potential performance of each of the modules 14–17, when the system 10 is in an inactive state, a testing method may be performed which does not require a full supply 11 of pressurised air to be bled off from the engine.

In accordance with the method of the first aspect of the invention, the potential performance of each module 14–17 may be tested by operating the main inlet valve 12, and/or one or more selected inlet valves 14a–17a, to admit only a reduced air supply to the module or modules 14–17 being tested.

For example only, a testing method applied to one module, module 14 will be described.

The reduced air supply, that is a supply of air which is considerably reduced compared with the supply 11 made available to the product gas producing system 10 in normal operation, is provided for a test duration, to the module 14, whilst the outlet valve 14b is operated in its third state. The reduced air supply will pass over the Zeolite bed of the module 14 and some nitrogen at least will be adsorbed. The product gas thus produced, which is not required for use, passes from the module 14 via the outlet valve 14b into the by-pass line 14e, and through the metering device 14f, to the low pressure environment feed duct 22. The low pressure environment may be for example, overboard of the aircraft, to ambient, or to a low pressure environment in the aircraft, such as the aircraft cabin.

At the outlet from the module 14, there is a sensing apparatus S1, which includes a sensor to sense the oxygen concentration in the product gas produced during the test period at least, and also the pressure of the product gas, which should be controlled by the pressure of the reduced air supply to the module 14 and the metering device 14f through which the product gas produced during testing is constrained to pass.

The outputs from the sensors of the sensing device S1 are passed to an analysing apparatus, which may be integral or separate from the system controller, where the outputs are analysed.

For a module 14 which is in good condition, i.e. the Zeolite bed is in good condition, relatively free from contaminants, for a known air supply in the test period, i.e. an air supply, the amount of which and pressure of which is known, the module would be expected to produce product gas at a known pressure and with a known concentration of oxygen. Because stable conditions are not instantaneously achieved, an instantaneous oxygen concentration reading or pressure determination by the sensor device S1 is unlikely to give any accurate indication of whether the module 14 under test is performing as expected.

Thus preferably the sensed oxygen concentration and product gas pressure over the test period is monitored, and compared with the expected performance of the module 14 over the test period.

Figure 2:
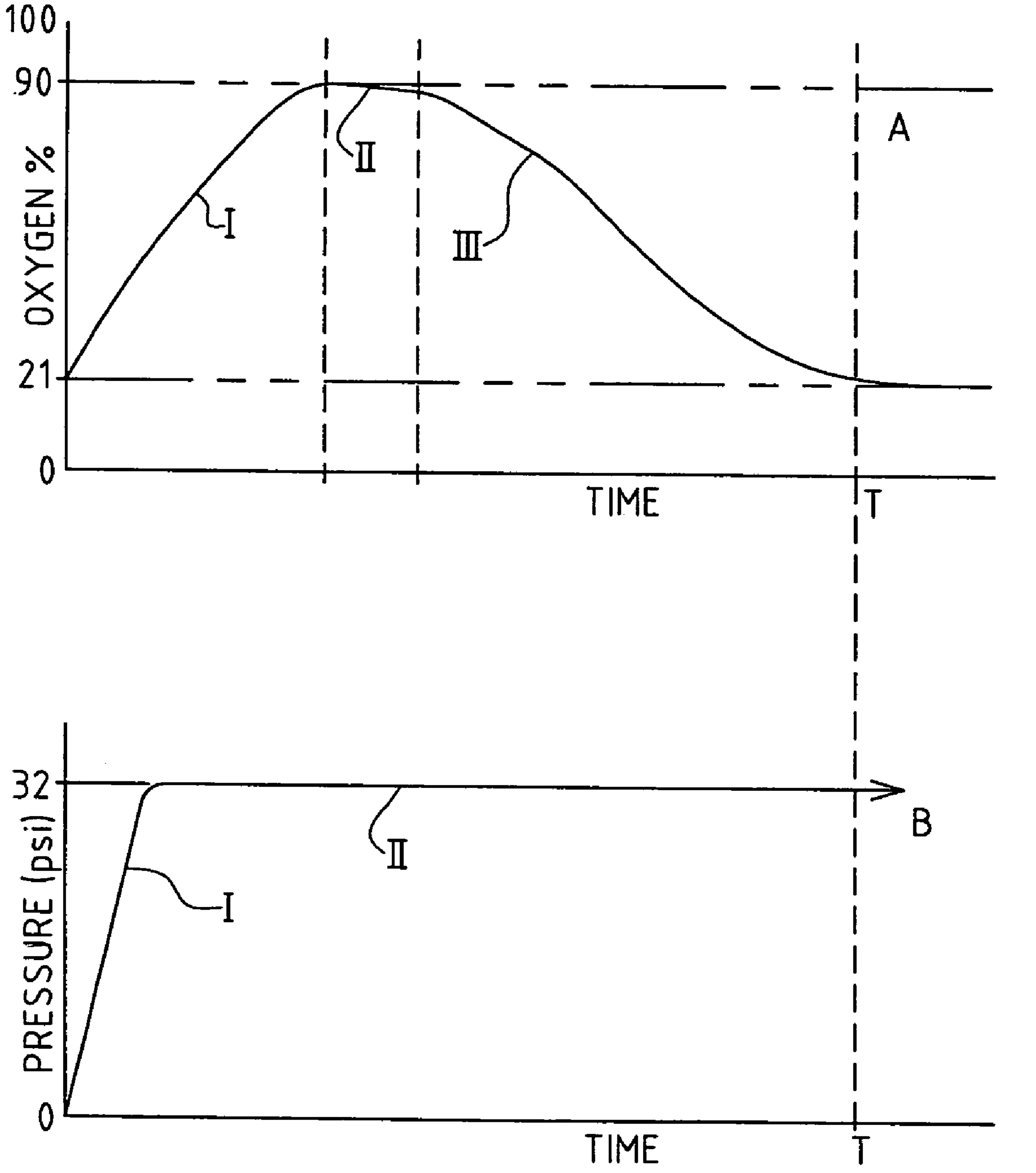
FIG. 2 shows by way of example, expected results for a module tested by the method of the first aspect of the invention.

Referring to FIG. 2, there is shown at A, graph plotting oxygen concentration against time for a given air supply (amount and pressure) over a test period T. By virtue of the nature of a Zeolite bed type product gas producing module 14, the maximum concentration of oxygen which the bed is capable of delivering is about 90%.

It can be seen in the area of the graph A indicated at I which relates to an initial operating period of the test period T, the oxygen concentration increases from a base concentration of about 21%, towards the maximum of 90%. During a second operating period of the test period, indicated at II the module is producing at least near to the maximum concentration of oxygen in the product gas, and in a third operating period of the test period T, indicated at III, oxygen concentration declines as the Zeolite bed becomes saturated with adsorbed nitrogen. The graph A shown thus gives an indication of how the module 14 is expected to perform during testing.

By comparing the actual sensed concentration of oxygen sensed by the sensing apparatus S1 with the expected concentration over the test period T, any discrepancy may be identified. For example a slow sensed rate of increase of oxygen concentration over the initial operating period I may indicate that the Zeolite bed is in poor condition, contaminated for example. The inability of the module to produce product gas with a near 90% oxygen concentration may too indicate a contaminated Zeolite bed.

Referring now to graph B in FIG. 2, product gas pressure is plotted against time over the test period T. The maximum pressure which the product gas may attain for the set up shown in FIG. 1, for particular volumes and pressures of reduced air supply, is shown.

It can be seen that the maximum pressure expected is about 32 psi, and that this pressure should rapidly be attained during the test period, as indicated at part I of the graph. This maximum pressure is expected to be maintained over the test period, as indicated at part II of the graph B. The pressure of the product gas sensed by the sensing device S1 is compared over the test period. If the product gas fails to attain the maximum expected pressure, this would indicate a leakage of supply air, or a blockage in the system 10 for examples, as may an increased or decreased speed of pressure build up in period I.

The sensed oxygen concentration and product gas pressure may be compared with expected results as suggested in the graphs A and B of FIG. 2, by any suitable mathematical modelling means, or by analogue comparison or any other known or yet unknown comparison technique.

Thus by performing the method of the first aspect of the invention, the performance of any of the modules 14–17 may be checked against expected performance. If desired, any module 14–17 which is identified as underperforming may automatically be subjected to remedial treatment such as prolonged purging (venting) of adsorbed nitrogen, and/or the introduction of product gas in an effort to reactivate the Zeolite or other molecular bed material, to improve its condition.

It will be appreciated that air bled from an aircraft engine, may be hot, typically at a temperature of several hundreds of degrees centigrade. In normal use of the system 10 of FIG. 1, when a supply of breathing gas is required, it is usually necessary to cool the bleed air before introducing it into the system 10, or at least before providing the product gas for breathing. This cooling may be achieved for example by passing the bleed air through a heat exchanger where the hot bleed air may give up its temperature to cooler ambient air, for example ram air which passes through the heat exchanger as result of the movement of the aircraft through the air, or fanned ambient air.

However, because only a reduced supply of air is used during the testing method described, cooling of the bleed air is unlikely to be required, because the reduced flow of hot air will readily give up its temperature to for example, ducting through which the bleed air flows from the engine to the system.

In this embodiment, testing of a module may be achieved over a single cycle of operation.

Various modifications may be made without departing from the scope of the invention. For example, instead of providing a metering device 14*f*–17*f* for each module 14–17, a common metering device 30 may be provided in the duct 22 to the low pressure environment, or in both positions. Although the invention has been described for testing a single module 14, each module 14–17 may be tested in turn, or a plurality of modules may be tested simultaneously. Where the modules 14–17 are only tested individually, a single sensing apparatus may be provided, e.g. at S in the duct 22 to the low pressure environment. If desired, a one way valve 31 may be provided to prevent the backflow of product gas from the duct 22 to the low pressure environment to the product gas producing system 10.

An alternative method of testing the performances of the modules 14–17 will now be described which does not require the performance of individual modules 14–17 to be tested to identify any module 14–17 which is underperforming.

As described above, different control regimes for operating the modules 14–17 are known, to ensure that each module is used, and thus ages to generally the same extent for example. Thus in one control regime, the modules 14–17 may be operated as pairs of modules.

For example, in normal operation, module 14 may be operated in its product gas producing phase, whilst another module with which the module 14 is paired, for example, module 15 may be operated in its venting (purging) phase.

The contributions of product gas produced by the individual modules 14–17 could be monitored as described above to determine if any of the modules 14–17 is underperforming.

Figure 3:
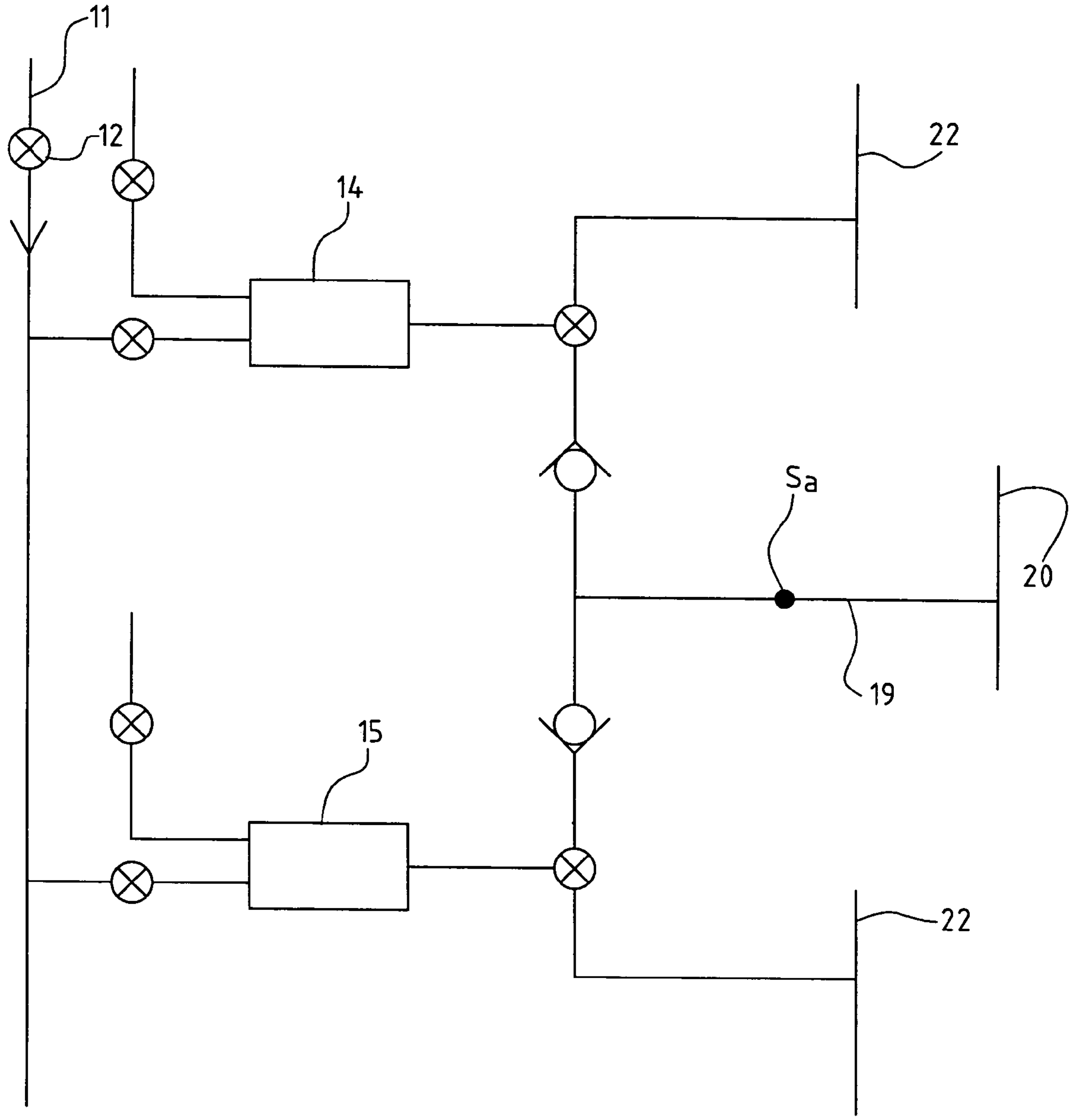
FIG. 3 shows part of the system of FIG. 1 modified to indicate how an alternative method of the third aspect of the invention may be performed.

However, if the combined contributions of a pair of modules 14, 15 only is monitored, an indication that the pair of modules 14, 15 is underperforming would not give an indication as to which of the modules 14 or 15 is underperforming. In FIG. 3, there is shown for illustrative purposes only, an alternative configuration of a pair of modules 14, 15 in which both of the modules 14, 15 contribute product gas to a common outlet line 19, there being a single sensing apparatus Sa in the outlet line 19 to determine a parameter such as oxygen concentration/product gas pressure in the outlet line 19 as and when required. Such configuration is possible in the arrangement of FIG. 1 if a single sensing apparatus S was provided in the duct 22 to the low pressure environment or where the outlets from the modules 14–17 converge.

In a first realisation of the method of the third aspect of the invention, a specific test procedure is invoked, when the breathing gas producing system 10 is not required to produce product gas for breathing. Thus in this example the single sensor apparatus shown at S in duct 22 to the low pressure environment may be used.

First, a reduced supply of air is provided to the pair of modules 14, 15 which are operated in tandem as described above, with first the module 14 being operated to produce product gas whilst the other module 15 of the pair is vented (purged), and then vice versa. Pressure in the gas-producing module 14, 15 is maintained by virtue of the metering devices 14*f*, 15*f*, and the combined contributions of product gas are monitored by the sensing apparatus S in the duct 22 to the low pressure environment.

After a test period which may be a single or plurality of operating cycles of the pair 14, 15, the module 15 is then operated as a tandem pair with another module 16, and thus the contributions of product gas by the pair 15, 16 of modules is monitored over a test period, and so on with each of the modules 14–17 being operated as a pair with at least two other modules.

If for example, the module 15 has a Zeolite or other molecular bed contaminated, when the module 15 is operated as a tandem pair with module 14, the pair would be determined as hereinafter explained, to be underperforming. Also, when the module 15 is operated as a tandem pair with the module 16, that pair too would be determined to be underperforming. However, when modules 14, 16 and 17 are each operated in tandem pairs with other than the module 15, the pair would adequately perform.

Thus it can be determined that it is module 15 which is underperforming.

In the generality, each of the N modules (where N is any number of the modules provided n the system 10) may be operated in combination with at least a first other module or set of other modules, and then with a second other module or set of other modules, whilst the performances of each of the combinations are compared to determine which if any of the N modules is underperforming.

In this realisation, a single or multiple parameters of the product gas may be monitored, for example one or both of oxygen concentration and product gas pressure, but instead of comparing this or these with expected results, the performances of the different combinations may simply be compared. Thus this method is for example, aircraft engine performance independent, whereas the expected results, for example shown in the graphs A and B of FIG. 2 may vary with aircraft performance e.g. engine speed.

In a second realisation of the method of the third aspect of the invention, the method may be performed when the breathing gas producing system 10 is operating to provide product gas for breathing. In this case a sensing apparatus Sa (see FIG. 3) is required to sense one or more parameters of the product gas produced by a combination of modules in the product gas supply line 19. A complex arrangement of valves and connecting lines would be required to change the combination of combined modules working together, but by comparing the relative performances of different combinations of N modules working together over test periods, a module or module which is underperforming may be identified. In this method, because the demand for product gas will not always be the same, there will not necessarily be a constant flow of air through the system 10, and thus comparison of sensed parameter(s) with expected results may not give any meaningful indication of the underperformance of any module. Thus comparative performance tests would be required.

The methods of the invention described may be performed subsequent to a higher level test in which a group of modules may be identified, one of which may be underperforming to determine which of the modules is underperforming.

Instead of each module 14–17 having an associated three-way outlet valve 14*b*–17*b*, each module 14–17 could have an associated two way valve, with there being another two way valve in the common line 19 to the supply system 20.

Although the invention has specifically been described in relation to modules with molecular sieve beds, the invention may be applied where other kinds of OBOGS are provided, such as for example only, ceramic type oxygen generating OBOGS.

What is claimed is:

1. A method of testing a system including a plurality of modules, each of which produces a product gas from an air supply, wherein the product gas is one of oxygen gas and oxygen enriched gas, the method including providing a restricted air supply to an inlet to at least one of the modules, when the module is being tested, monitoring each of oxygen concentration and product gas pressure over a test period at an outlet of the module, and comparing the monitored oxygen concentration and product gas pressure over the test period with an expected performance of the at least one module over the test period to determine the potential performance of the module in use.

2. A method according to claim 1 wherein the module includes a bed of molecular sieve bed material which adsorbs nitrogen gas from the air supply, and after the test period, the module under test, is vented, to cleanse the bed.

3. A method according to claim 1 wherein where the module includes a bed of molecular sieve bed material, the air supply is a pressurised air supply, and the bed is vented after the test period, to a lower pressure environment.

4. A method according to claim 1 wherein the method includes testing the one module or a set of modules, and then subsequently testing another module or set of modules.

5. A method according to claim 1 wherein during the test period, the product gas produced passes from the module via a metering device to maintain pressure within the module.

6. A method according to claim the 5 wherein during the test period, the product gas is passed via the metering device to a lower pressure environment.

7. A method according to claim 1 wherein the method includes supplying to the selected module, a metered air supply during the test period, so that the actual sensed oxygen concentration and pressure of the product gas is compared with results expected for that metered air supply.

8. A method according to claim 7 wherein metering is achieved locally of the inlet of the module by partially opening only, an inlet valve.

9. A method according to claim 7 wherein, a metering valve is provided upstream of the inlet of the module, so that a common metered supply is provided to each of the modules of the system, for testing each of the modules.

10. A system including a plurality of modules, each of which produces a product gas which is one of oxygen gas and oxygen enriched gas from an air supply, a metering device for metering the air supply to provide a restricted air supply to at least one of the modules for testing, a sensor for sensing the concentration of oxygen in the product gas produced from the restricted air supply during a test period, and a sensor for sensing the pressure of the product gas produced from the restricted air supply during the test period, and there being an analysing apparatus to compare the sensed oxygen concentration and sensed pressure of the product gas over the test period with an expected performance of the at least one of the module to determine the potential performance of the module in use.

11. A method of testing a system including a plurality of modules, each of which in use, produces from an air supply, a product gas which is one of oxygen gas and oxygen enriched gas, the method including operating a selected one of the modules with a first module or a first set of the remaining modules by providing to inlets of the selected module and the first module or the modules of the first set, an air supply, sensing a parameter of the product gas, produced by the selected module and the first module or modules of the first set of modules, operating the selected module with a second module or a second set of the remaining modules, the second module or modules of the second set being different from the first module or modules of the first set, and sensing the parameter of the product gas produced by the selected module and the second module or the modules of the second set, and comparing the parameter sensed with the parameter sensed while the selected module is operated with the first module or first set of modules, to determine the performance of the selected module.

12. A method according to claim 11 wherein where the system includes N modules, a first and a second module being operated together, then the second and a third and so on up until the Nth and first module being operated together.

13. A method according to claim 11 wherein the parameter sensed is one of oxygen concentration in the product gas, and product gas pressure.

14. A method according to claim 11 wherein the method is performed during normal operation of the system.

15. A method according to claim 11 wherein the method is performed repeatedly, selecting a different module sequentially, whereby the analysis identifies any module which is underperforming where the method is a specific test, or is underperforming in use.

16. A method according to claim 11 wherein the method is performed subsequently to a higher level test as a result of which a group of the modules is identified which includes at least one underperforming module.

17. A method according to claim 11 wherein the method is performed as a specific test method and includes providing to the inlets to the selected module and the first module or first set of the remaining modules, when the modules are not in use, a restricted air supply, and at outlet or outlets of the modules, sensing the parameter, and subsequently providing to the inlets to the selected module and the second module or second set of remaining modules, the restricted air supply, and at an outlet or outlets from the modules, sensing the parameter, and comparing the respective parameters sensed.

18. A method according to claim 17 wherein the air supply is restricted by metering the product gas to restrict the flow of product gas from the system, thereby to maintain a high pressure in the system.

* * * * *

UNITED STATES PATENT AND TRADEMARK OFFICE

CERTIFICATE OF CORRECTION

PATENT NO. : 7,152,494 B2
APPLICATION NO. : 10/753789
DATED : December 26, 2006
INVENTOR(S) : David J. Peacey et al.

It is certified that error appears in the above-identified patent and that said Letters Patent is hereby corrected as shown below:

Column 9, line 41, “to claim the 5 wherein” should be -- to claim 5 wherein --.

Signed and Sealed this

Twenty-seventh Day of October, 2009

David J. Kappos

*Director of the United States Patent and Trademark Office*